Patented Apr. 7, 1942

2,278,742

UNITED STATES PATENT OFFICE 2,278,742

METHOD OF FORMING LUMINESCENT SCREENS

William J. Scott and James T. Anderson, Rugby, England, assignors to General Electric Company, a corporation of New York No Drawing. Application April 14, 1938, Serial No. 202,012. In Great Britain April 20, 1937

4 Claims. (Cl. 91—70)

The present invention relates to methods of applying a coating of a powder, such as a fluorescent powder, to a surface, such as a glass surface.

Luminescent screens have hitherto been proposed in which the glass was coated with a binder such as potassium silicate, the luminescent powder being applied to the coating which is then dried. At other times the glass has also been coated with an adhesive substance such as glycerine and boric acid to which the powder has been applied, the glass being then heated to evaporate the glycerine and fuse the powder to the glass. A further method which has been proposed in co-pending application Serial Number 67,180, filed March 4, 1936 is to form a silica gel on the surface of the glass by etching it with hydrofluoric acid, the powder being dusted on while the surface of the glass is sticky after which the surface is heated and dried.

This last method has particular advantage for sticking powder to be excited by ultra violet rays for, in addition to being chemically neutral to most of the powders in use, the silica film is transparent to the exciting ultra violet rays.

The object of the present invention is to provide a simple and effective method of applying a powder to a glass surface. Still further objects and advantages of the invention will be apparent to those skilled in the art from the following particular description thereof and from the appended claims.

In accordance with this object the invention comprises the step of cementing the luminescent powder to the supporting body with a colloidal suspension of silica in a vaporizable medium. Such a substance consisting of a colloidal suspension of silica in alcohol is procurable on the market under the name of Silicon Ester preparation. It is known also that silica in a gelatinous or colloidal form is produced by the action of an acid on a soluble silicate, but in this case it is impractical to get the silica free from the acid and soluble salts taking part in the reaction. The colloidal silica compound is applied, for example, by spraying, brushing, wiping or "pouring and draining" on to the surface to be coated, and the powder afterwards poured or dusted on, or alternatively a suspension of the powder in the colloidal silica compound can be applied. After the powder is applied to the surface the moisture is driven off by heating.

This latter method of applying a suspension of the luminescent material in the colloidal silica compound has a particular advantage in that the coating of silica formed all over the luminescent material, in addition to binding on the material, also protects it from any poisoning action of the discharge. This is important in the case of fluorescent coatings—e. g. zinc silicate—excited by a low pressure, positive column mercury vapor discharge, as it is well known that such internally coated discharge tubes having high initial efficiencies of some 80 lumens/watt, fall off very rapidly in efficiency, while similar tubes with the fluorescent coating screened from the discharge with a partition permeable to the ultra violet radiation of the discharge, do not show this rapid falling off in efficiency.

As an alternative to the above process the fluorescent material may be previously coated with a layer of silica, and secured to the glass by any suitable method.

One or more coats of colloidal silica compound may also be applied over a layer of luminescent powder already stuck to the glass by the method of this invention or any suitable method.

What we claim as new and desire to secure by Letters Patent of the United States, is:

1. The method of increasing the longevity of an electric discharge lamp comprising a luminescent powder on the inner surface of the envelope thereof which comprises the step of providing a protective, light-transmitting coating of silica all over said powder by covering said powder with a material consisting of a colloidal suspension of silica in a liquid and then driving off said liquid.

2. The method of forming a luminescent coating for an electric discharge lamp to increase the longevity of the lamp which consists in mixing a luminescent powder with a material consisting of a colloidal suspension of silica in a liquid, applying the admixture to the interior surface of the envelope of the lamp and driving off the liquid to leave a residue of luminescent powder, each individual particle of which has a protective, ultra violet ray transmitting coating of silica all over its surface.

3. The method of forming a luminescent coating for an electric discharge lamp to increase the longevity of the lamp which consists in mixing a luminescent powder with a material consisting of a colloidal suspension of silica in a liquid, driving off the liquid to form a protective ultra violet ray transmitting coating of silica all over each individual particle of said luminescent powder and applying the coated powder to the interior surface of the lamp envelope.

4. The method of forming a luminescent coating for an electric discharge lamp to increase the longevity of the lamp which consists in applying a coating of luminescent powder to the interior surface of the lamp envelope, covering the luminescent powder with a material consisting of a colloidal suspension of silica in a liquid and driving off the liquid to form a protective, ultra violet ray transmitting coating of silica all over the surface of each individual particle of luminescent powder exposed to the discharge.

WILLIAM J. SCOTT.
JAMES T. ANDERSON.